US009678924B2

(12) United States Patent
Goettfert et al.

(10) Patent No.: US 9,678,924 B2
(45) Date of Patent: Jun. 13, 2017

(54) METHOD AND DATA PROCESSING DEVICE FOR RECONSTRUCTING A VECTOR

(71) Applicant: INFINEON TECHNOLOGIES AG, Neubiberg (DE)

(72) Inventors: Rainer Goettfert, Putzbrunn (DE); Berndt Gammel, Markt-Schwaben (DE); Thomas Kuenemund, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 264 days.

(21) Appl. No.: 14/470,953

(22) Filed: Aug. 28, 2014

(65) Prior Publication Data
US 2015/0067012 A1 Mar. 5, 2015

(30) Foreign Application Priority Data
Aug. 28, 2013 (DE) .................. 10 2013 109 315

(51) Int. Cl.
*G06F 17/16* (2006.01)
*G06F 7/58* (2006.01)
*H04L 9/08* (2006.01)

(52) U.S. Cl.
CPC .............. *G06F 17/16* (2013.01); *G06F 7/588* (2013.01); *H04L 9/0866* (2013.01); *H04L 2209/34* (2013.01)

(58) Field of Classification Search
None
See application file for complete search history.

(56) References Cited

U.S. PATENT DOCUMENTS

| 6,167,551 | A | 12/2000 | Nguyen et al. |
| 8,046,661 | B2 * | 10/2011 | Lablans .................. G06F 11/08 708/530 |
| 8,386,990 | B1 | 2/2013 | Trimberger et al. |
| 9,252,960 | B2 * | 2/2016 | Schrijen ................ H04L 9/3278 |

\* cited by examiner

*Primary Examiner* — Michael D Yaary
(74) *Attorney, Agent, or Firm* — Viering, Jentschura & Partner mbB (57) ABSTRACT

A method for reconstructing a first vector from a second vector includes: storing code for the row vectors according to a first code and a second code; correcting the row vectors of the second vector corresponding to the first vector so that the row vectors of the second vector have the same code as the row vectors of the first vector; calculating the code of the column vectors of the second vector according to the second code; comparing the code of the row vectors of the second vector with the code of the column vectors of the first vector; identifying the columns in which the first vector is unequal to the second vector; the rows in which the first vector is unequal to the second vector; and the components in which the first vector is not equal to the second vector, and correcting the components of the second vector.

18 Claims, 7 Drawing Sheets

$A'' \approx$

FIG 5B

$A'' \approx$

FIG 5C

$A'' \approx$

FIG 5D $A'' \approx$

FIG 5E

METHOD AND DATA PROCESSING DEVICE FOR RECONSTRUCTING A VECTOR

CROSS-REFERENCE TO RELATED APPLICATION

This application claims priority to German Patent Application Serial No. 10 2013 109 315.9, which was filed Aug. 28, 2013, and is incorporated herein by reference in its entirety.

TECHNICAL FIELD

Various embodiments relate generally to methods and data processing devices for reconstructing a vector.

BACKGROUND

PUFs (Physical Uncloneable Functions) are important for security-related applications, such as, for example, authentication. In the case of a plurality of PUF generations, mechanisms for generating PUF values generally provide similar but not identical PUF values, but this is typically required, depending on the application concerned, e.g. for key generation.

SUMMARY

A method for reconstructing a first vector from a second vector includes: storing code for the row vectors according to a first code and a second code; correcting the row vectors of the second vector corresponding to the first vector so that the row vectors of the second vector have the same code as the row vectors of the first vector; calculating the code of the column vectors of the second vector according to the second code; comparing the code of the row vectors of the second vector with the code of the column vectors of the first vector; identifying the columns in which the first vector is unequal to the second vector; the rows in which the first vector is unequal to the second vector; and the components in which the first vector is not equal to the second vector, and correcting the components of the second vector.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These example embodiments are described in such detail that the person skilled in the art can carry out the invention. Other embodiments are also possible and the example embodiments can be modified in a structural, logical and electrical respect without deviating from the subject-matter of the invention. The different example embodiments are not necessarily mutually exclusive, but different embodiments can be combined with one another so that new embodiments arise.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide efficient methods which enable a PUF (Physical Uncloneable Functions) value generated in a second PUF generation to be corrected in such a way that it matches the PUF value generated in a first PUF generation.

According to one embodiment, a method for reconstructing a first vector from a second vector is provided which has: storage, according to a matrix representation of the first vector, of code information for the row vectors according to a first code; storage, according to the matrix representation of the first vector, of code information for the column vectors according to a second code; correction of the row vectors of a matrix representation of the second vector corresponding to the matrix representation of the first vector so that the row vectors of the second vector have the same code information according to the first code as the row vectors of the first vector; calculation of the code information of the column vectors of the matrix representation of the second vector according to the second code; comparison of the code information of the row vectors of the second vector with the code information of the column vectors of the first vector; identification, based on the result of the comparison, of the columns of the matrix representation in which the first vector is not equal to the second vector; identification, on the basis of the errors in the columns correctable by means of the second code, of the rows of the matrix representation in which the first vector is not equal to the second vector; identification, on the basis of the identified columns and the identified rows, of the components in which the first vector is not equal to the second vector, and correction of the identified components of the second vector.

The abbreviation PUF stands for "Physically Uncloneable Function", or physical hash function. The idea in this case is to digitize physical characteristics of an object and thus obtain a bit sequence (number) assigned to the object. It is desirable in this case for the bit sequences of two different physical objects to be uncorrelated with one another. A simple illustrative example is a sheet of paper. Examination under a microscope reveals a specific fine structure of the wood chips or pulp parts. The structure can be measured by means of a suitable method and the result can be represented as a bit sequence. This bit sequence is the PUF or PUF value for the sheet. With this procedure, a different sheet of paper generally produces a bit sequence that is uncorrelated to the bit sequence of the first sheet.

The process for generating a bit sequence (the PUF value) from the characteristics of the physical object is referred to as PUF generation. It is desirable for the PUF generation to be possible in an efficient manner.

One desirable characteristic of a PUF generation mechanism is that the same physical object produces the same bit sequence each time with each PUF generation (e.g. with each PUF request). However, this is typically not the case. A repeated PUF generation for the same physical object typically provides bit sequences which are very similar to one another but are not generally identical to one another. This shortcoming can be made good using coding theory (error correction) methods.

The following procedure, for example, is carried out here: A physical object is assumed. The first PUF bit sequence A allocated to the object is generated, A being designated as the true PUF value. An associated auxiliary vector b is calculated from the true PUF value A. The auxiliary vector b is regarded as publicly accessible information. For example, b is stored in a non-secure environment. The true PUF value A itself is secret and is not stored at all and is therefore also not directly available. In a subsequent, new PUF generation, a new PUF value A' is obtained. The value A' is generally not identical to A, but differs only slightly from A. The aim is to recover the true PUF value A by reconstructing it from the available current PUF value A'. The stored auxiliary data b are used here.

According to different embodiments, a PUF correction method (or PUF reconstruction algorithm) is provided for PUF values with low error probabilities and therefore small PUF sizes.

Figure 1:
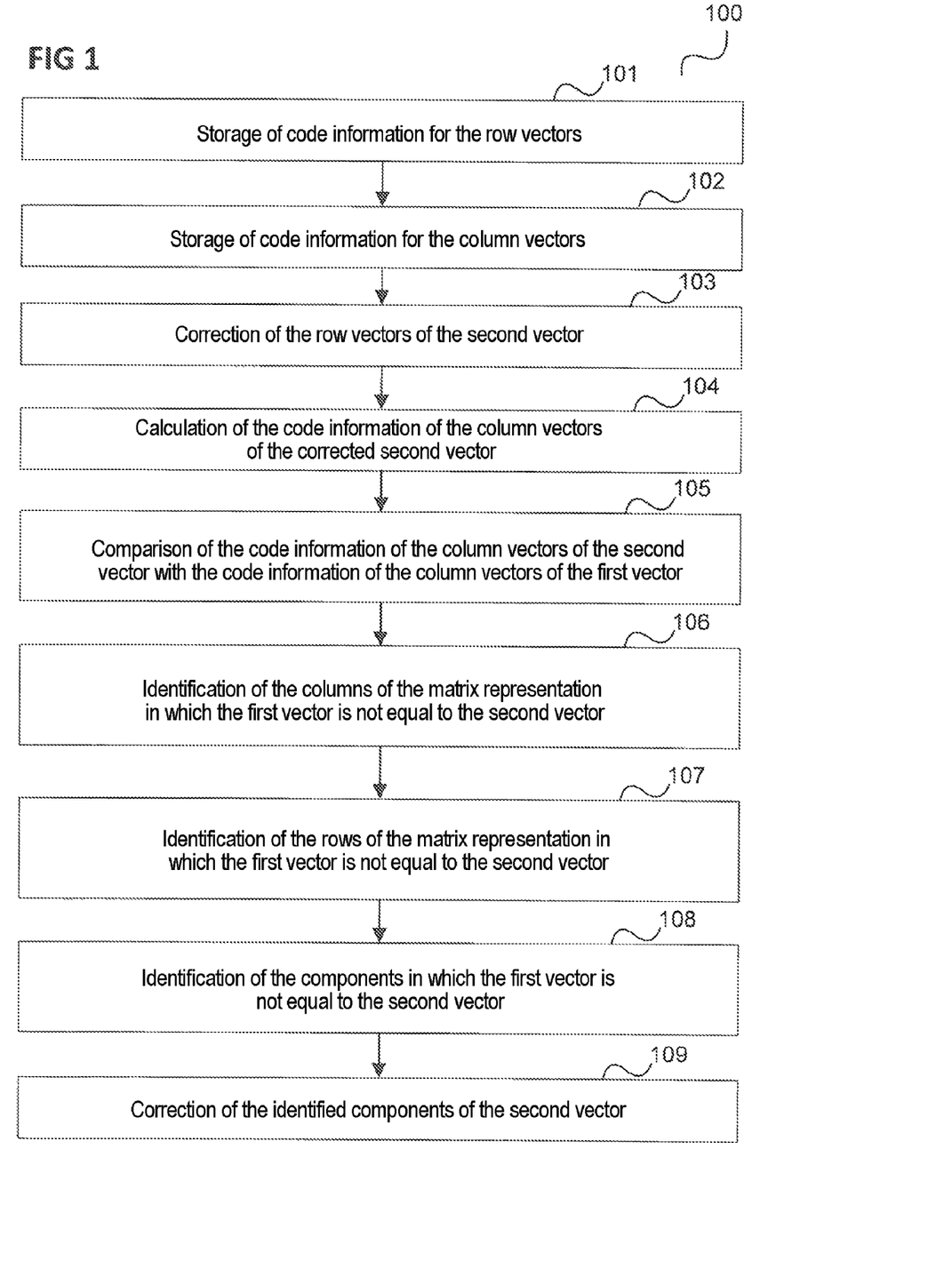
FIG. 1 shows a flowchart illustrating a method for reconstructing a vector according to one embodiment.

FIG. 1 shows a flowchart 100.

The flowchart 100 illustrates a method for reconstructing a first vector from a second vector according to one embodiment.

In 101, according to a matrix representation of the first vector, code information is stored for the row vectors according to a first code.

In 102, according to the matrix representation of the first vector, code information is stored for the column vectors according to a second code.

In 103, the row vectors of a matrix representation of the second vector corresponding to the matrix representation of the first vector are corrected so that the row vectors of the second vector have the same code information according to the first code as the row vectors of the first vector.

In 104, the code information of the column vectors of the matrix representation of the second vector (the row vectors of which are corrected by means of the code information according to the first code following 103) is calculated according to the second code.

In 105, the code information of the column vectors of the second vector is compared with the code information of the column vectors of the first vector.

In 106, on the basis of the result of the comparison, the columns of the matrix representation in which the first vector is not equal to the second vector are identified.

In 107, using the errors in the columns correctable by means of the second code, the rows of the matrix representation in which the first vector is not equal to the second vector are identified.

In 108, using the identified columns and the identified rows, the components in which the first vector is not equal to the second vector are identified.

In 109, the identified components of the second vector are corrected.

According to one embodiment, a second vector is, in other words, corrected in the direction of a first vector or, in other words, the first vector is reconstructed from the second vector (using the code information which can be regarded as stored auxiliary data). Evidently, in a matrix representation of the first vector, the code information of the first code is generated and stored for the rows and the code information of the second code is generated and stored for the columns.

The code information of the first code is used to correct the rows (in a corresponding matrix representation of the second vector, i.e. in a matrix representation of the second vector in which the components of the second vector are arranged in the same manner as the components of the first vector in the matrix representation of the first vector). Errors may occur here, i.e. the correction of the second vector in the direction of the first vector may be incomplete or incorrect.

The columns in which errors are present (i.e. are present in the components which are different in the first vector and in the second vector) can be identified by means of the second code information. If an error of this type is correctable, the component and therefore the errored row can thus be identified. Once the errored row is identified, the errored components in the columns which are not correctable by means of the second code (because too many errors are present in the same column) can also be identified and corrected.

According to one embodiment, the code information for a column vector is a syndrome of the column vector and the code information for a row vector is a syndrome of the row vector.

For example, the components which are located in the identified rows in columns which have errors that cannot be corrected by means of the second code are identified as the components in which the first vector is not equal to the second vector.

According to one embodiment, the row vectors of the second vector are corrected so that the row vectors of the second vector have the same code information according to the first code as the row vectors of the second vector, in such a way that the number of modified components of the second vector is minimal.

For example, the first vector and the second vector in each case represent a PUF value.

For example, the first vector represents a true PUF value and the second vector represents a newly generated PUF value.

The first vector and the second vector are, for example, binary vectors.

The first code is, for example, a linear code.

The first code is, for example, the (23, 12, 7) Golay code.

The second code is, for example, a linear code.

For example, the second code has an even minimum distance.

For example, the second code has the minimum distance 4.

According to one embodiment, the second code is an extended Hamming code.

The second code is, for example, the (16, 11, 4) extended Hamming code.

According to one embodiment, the matrix representation of the first vector is a representation of the first vector as a matrix in which consecutive segments of the vector form the rows of the matrix.

The method furthermore includes, for example, the performance of a cryptographic operation based on the corrected second vector.

For example, the method furthermore comprises the derivation of a cryptographic key from the corrected second vector.

Figure 2:
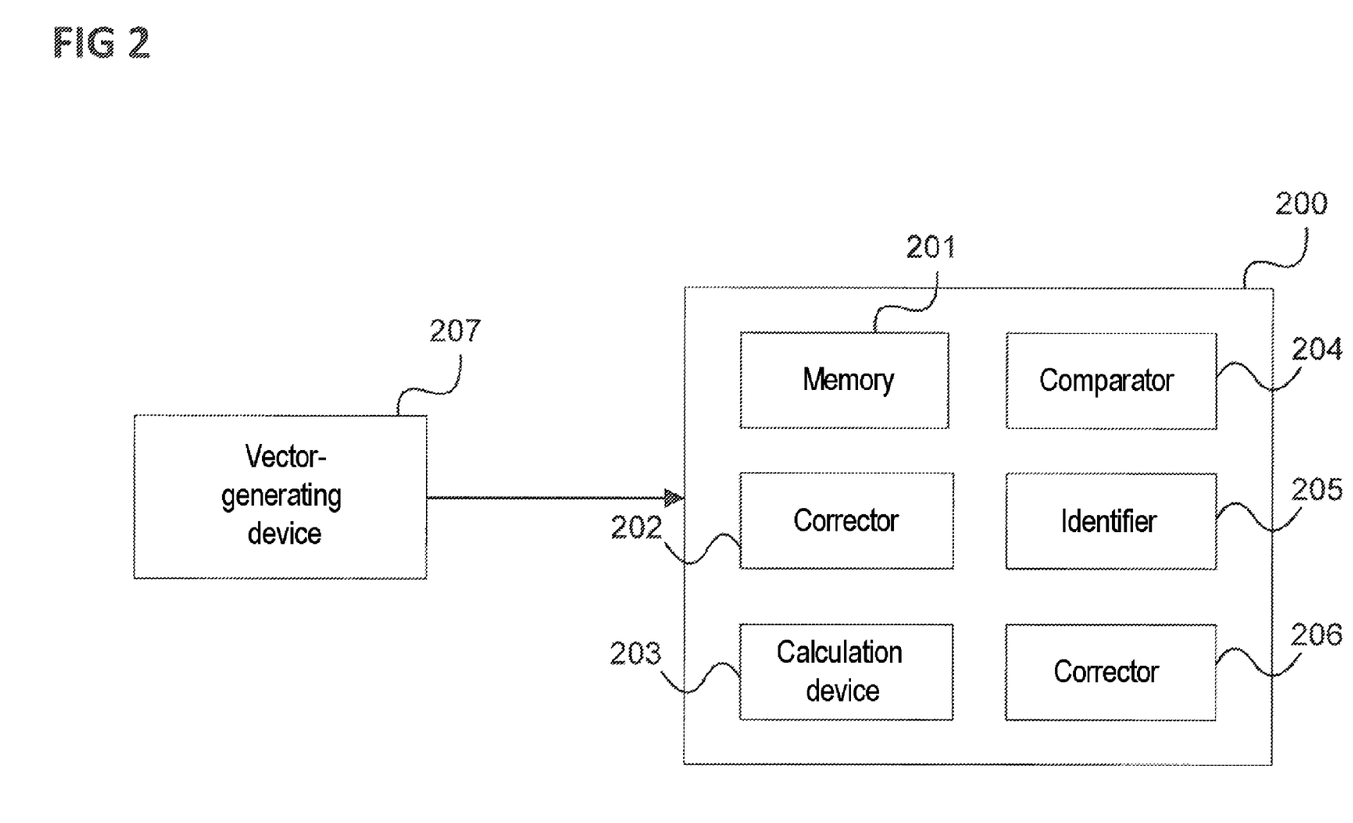
FIG. 2 shows a data processing device for reconstructing a vector according to one embodiment.

The method shown in FIG. 1 is carried out, for example, by a device as shown in FIG. 2.

FIG. 2 shows a data processing device 200 according to one embodiment.

The data processing device 200 is a data processing device for reconstructing a first vector from a second vector.

The data processing device 200 has a memory 201 for storing, according to a matrix representation of the first vector, code information for the row vectors according to a first code and for storing, according to the matrix representation of the first vector, code information for the column vectors according to a second code.

The data processing device 200 furthermore has a first corrector 202 for correcting the row vectors of a matrix representation of the second vector corresponding to the matrix representation of the first vector, so that the row vectors of the second vector have the same code information according to the first code as the row vectors of the first vector.

Furthermore, the data processing device 200 has a calculation device 203 for calculating the code information of the column vectors of the matrix representation of the second vector according to the second code, and a comparator 204 for comparing the code information of the column vectors of the second vector with the code information of the column vectors of the first vector.

The data processing device furthermore has an identifier 205 for identifying, on the basis of the result of the comparison, the columns of the matrix representation in which the first vector is not equal to the second vector, for identifying, using the errors in the columns correctable by means of the second code, the rows of the matrix representation in which the first vector is not equal to the second vector, and for identifying, using the identified columns and the identified rows, the components in which the first vector is not equal to the second vector.

The data processing device furthermore has a second corrector 206 for correcting the identified components of the second vector.

The first vector and the second vector are, for example, provided by a vector-generating device 207, e.g. a PUF device for generating PUF values. The data processing device 200 has, for example, a preprocessing device (e.g. a processor) which is configured to calculate the code information according to the first code and the code information according to the second code for the first vector and store in the memory.

The components of the data processing device (the correctors, the calculation device, the comparator and the identifier) can be implemented by means of one or more circuits. In one embodiment, a "circuit" is to be understood to mean the unit which implements a logic and which may be hardware, software, firmware or a combination thereof. In one embodiment, a "circuit" can therefore be a hardwired logic circuit or a programmable logic circuit such as, for example, a programmable processor, e.g. a microprocessor. A "circuit" can also be understood to mean a processor which runs software, e.g. any type of computer program. In one embodiment, a "circuit" can be understood to mean any type of implementation of the functions described below.

Embodiments described in connection with the method shown in FIG. 1 are analogously valid for the data processing device 200 and vice versa.

The data processing device 200 is arranged, for example, on a chip card or in an RFID tag, for example in a chip card module.

Two example embodiments are described in detail below. In the first example embodiment, the PUF value is 368 bits long. It is possible to obtain 132 key bits from the PUF value. A prerequisite for this is that the error rate in a new PUF generation does not exceed 2.1% (or 4.0%).

In the second example embodiment, the PUF value is 256 bits long and a 72-bit long key can be extracted. The permitted error rates are 2.3% (or 4.5%).

The respective two different error rates relate to the tolerance values 1:1 million (or 1:1000) in the PUF reconstruction. The tolerance value 1:1000 000 means that during one million PUF value generations, the reconstruction of the true PUF value from the currently generated PUF value may fail at most once. Accordingly, the tolerance value 1:1000 means that one failure during 1000 PUF generations is just acceptable.

Small PUF sizes, such as those used as a basis in the example embodiments described below, are particularly suitable for RFID chips. These chips are typically under huge price pressure and are therefore intended implementable with a minimal hardware area.

Substantially higher PUF values can also be used, for example 2000 to 5000-bit long PUF values, which can be used to extract a 128-bit long cryptographic key from them, but with substantially higher error rates of 10-20%, which in part explains the high PUF values. However, high error rates are not compatible with low PUF values. In the case of PUF implementations which have low error rates, substantially smaller PUF sizes are possible. The embodiments described below describe a PUF reconstruction method with which error rates below 3% can be achieved.

An error rate p of, for example, p=0.03 (i.e. 3%) which occurs in one PUF generation means that 3% errors occur on average in one PUF generation, i.e. 3% of the bit positions in a newly generated PUF value deviate from an originally generated, i.e. the true, PUF value. In other words, each bit of the PUF value is inverted in the event of a new PUF generation with the probability of p=0.03.

In the embodiments described below, the tolerance for the PUF reconstruction method is based, for example, on the assumption that the PUF reconstruction may fail at most once during 1 million PUF generations.

For a predefined p, the efficiency Eff(p) of a PUF reconstruction algorithm is defined by $$Eff[p] = \frac{\text{Key length}}{\text{PUF size}}$$

The PUF reconstruction methods according to the two embodiments described below have the efficiency Eff=132/368=0.36 (for p=2.1% and tolerance 1:1000 000)

and Eff=72/253=0.28 (for p=2.3% and tolerance 1:1000 000)

The higher the efficiency of a reconstruction method (also referred to below as the reconstruction algorithm), the better the reconstruction algorithm. Efficiency is therefore a useful measure when different reconstruction algorithms are compared with one another. However, it is typically appropriate only for comparing reconstruction algorithms with identical error rates with one another or, in the comparison of two reconstruction algorithms, for taking account of the associated error rates also.

In the following example embodiments, a combination of the following two binary linear codes is used for the PUF reconstruction:

a) The (23, 12, 7) Golay code;
b) The (16, 11, 4) extended Hamming code.

The codewords of the Golay code are 23 bits long. There are $2^{12}$=4096 different codewords. Any two codewords differ from one another in at least 7 bit positions. In other words, the Hamming distance d(c1,c2) of two different codewords c1, c2 is always greater than or equal to seven. From the minimum distance d=7, it follows that each 3-bit error (and also 1-bit and 2-bit error) that has occurred in a codeword can be corrected in the Golay code.

If a codeword c is dispatched and up to 3 bit errors occur in the codeword in the channel transmission, a Golay decoder (i.e. a decoder for the Golay code) can correct the errors that have occurred. The decoder therefore receives as input a 23-bit long message vector y, which has the Hamming distance 3 or less to the dispatched codeword c, and produces either the codeword c or the error vector e=y+c as the output vector.

The Golay code is typically attractive for two reasons. Firstly, it offers a simple, compact hardware implementation, and this applies in particular to the decoder also. Thus, the hardware costs can be calculated for an implementation of the Golay code for 2871 GE (Gate Equivalent, i.e. the area for the implementation of a NAND gate), wherein the area is mainly comprised by 451 required flip-flops. Space can possibly be saved here by using already existing memories, e.g. an existing RAM memory.

Secondly, the Golay code is perfect. This refers to the following characteristic: Let v be any 23-bit long vector. A uniquely defined codeword c then always exists with the characteristic d(v,c)≤3.

There is therefore precisely one codeword c which differs from v in at most three bit positions. If the vector v is fed as input to the decoder, the decoder then produces this uniquely defined codeword c (or the associated error vector e) as output.

For each possible input vector v (there are 223 possible input vectors), a decoder for the Golay code produces a unique codeword c as the output vector. If 0, 1, 2 or 3 errors have occurred in the codeword during the transmission, the decoder then corrects the errors that have occurred and outputs the correct (error-corrected) codeword. If 4 or more errors occurred in the transmission, the decoder then similarly produces a uniquely defined but incorrect codeword as the output vector. The output incorrect codeword contains at least 7 errors.

The (16, 11, 4) extended Hamming code has the length n=16, the dimension k=11 and the minimum distance d=4. Each codeword is 16 bits long. There are $2^{11}$=2048 different codewords. The following applies to every two different codewords c1, c2:

$D(c1,c2)>=4$, the two codewords therefore differ in at least 4 bit positions.

It follows from d=4 that each 1-bit error can be corrected in the extended Hamming code. A 2-bit error that has occurred can no longer be corrected (this would require d=5), but is always recognized.

A decoder for the extended Hamming code produces three possible statements depending on the input vector:

a) Input vector is error-free.
b) 1-bit error is present in the input vector (the 1-bit error is corrected).
c) 2-bit error is present in the input vector.

If 0, 1, or 2 bit errors have occurred during the transmission, the statements of the decoder correspond to the truth, but otherwise not.

The Hamming code and the extended Hamming code considered here allow a very economical hardware implementation. (It is even more economical than the implementation for the Golay code.)

The elements of the (23, 12, 7) Golay code and the (16, 11, 4) extended Hamming code are 23-bit or 16-bit long codewords. If 23-bit or 16-bit long segments are formed from a PUF value, these segments are generally not codewords. For this reason, the aforementioned codes cannot therefore be used directly. However, the codes can nevertheless be used for the PUF reconstruction by using the syndromes.

A linear (n, k, d) code is considered below to explain this procedure. n is the length of the codewords and k is the dimension of the code, which means that there are $2^k$ different codewords. d is the minimum distance of the code, which means that two different codewords differ at least in d coordinates.

The linear (n, k, d) code can be described by a binary (n-k)×n matrix H, referred to as the control matrix. The control matrix H of a linear (n, k, d) code has n-k rows and n columns. An n-bit long row vector c is a codeword of the (n, k, d) code precisely when the product from the control matrix H and the column vector $c^t$ is the zero vector:

$Hc^t=0$.

Let H be the control matrix of a linear (n, k, d) code, and y any given row vector of length n. This means that $S(y)=Hy^t$ is the syndrome of y. The syndrome S(y) is therefore a column vector of length n-k.

(NB: S(y)=0 precisely when y is a codeword.)

The syndrome of y typically plays an important part in almost all error correction algorithms for linear codes: As an example, a codeword c is dispatched. A potentially errored message vector y is received. The syndrome S(y) is then calculated and fed as input to the decoder. The decoder calculates the error vector d from the syndrome S(y). And finally, the codeword c is calculated from d, by c=y+e.

As an example, let n=8, y=11110011, and e=01000000. Then c=y+e=10110011.

The significance of the syndrome is determined by the following characteristic:

$S(y)=S(c+e)=S(c)+S(e)=0+S(e)=S(e)$.

The syndrome of the received message vector y is therefore identical to the syndrome of the error vector e.

In the (23, 12, 7) Golay code, the control matrix has n-k=23-12=11 rows and n=23 columns. The control matrix of the Golay code is therefore an 11×23 matrix. The syndromes in the Golay code are therefore column vectors of length 11.

In the (16, 11, 4) extended Hamming code, the control matrix is a 5×16 matrix and the syndromes are column vectors of length 5.

A PUF reconstruction method will now be described below according to one example embodiment with a 368=16×23-bit long PUF value A=(a1, a2, a3, . . . , a368) with reference to FIG. 3. According to the representation of a PUF value as a bit sequence, a PUF value is also regarded as a PUF vector (with the individual bits of the PUF value as components). In various embodiments, values in binary representation can be regarded as binary vectors and vice versa.

Figure 3:
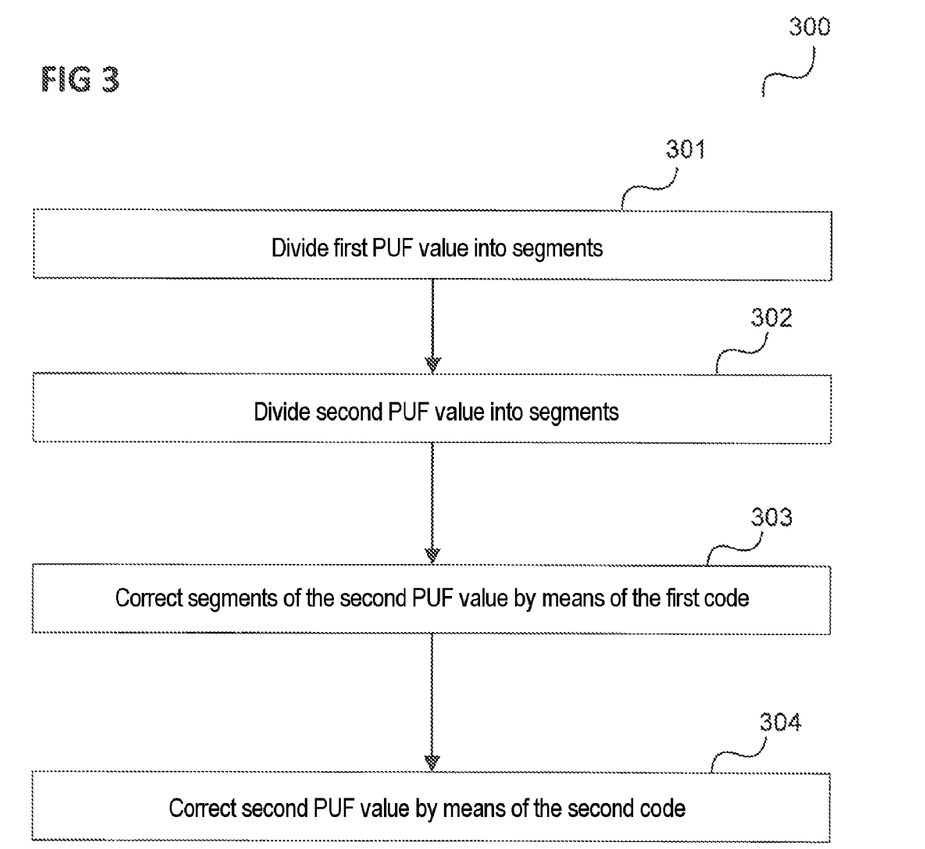
FIG. 3 shows a flowchart illustrating a reconstruction method for a PUF value according to one embodiment.

FIG. 3 shows a flowchart 300.

In 301, A is divided up into 16 segments of length 23:

$$A=(A1,A2,A3,\ldots,A16)$$

Each individual segment Aj, j=1, 2, . . . , 16, is then processed with the (23, 12, 7) Golay code.

A is used as a true PUF value. In a new PUF generation, a current PUF value A' is generated which generally differs from A. In 302, the current PUF value A' is similarly divided up into segments of length 23:

$$A'=(A1',A2',A3',\ldots,A16')$$

In 303, all segments Aj' in which at most 3 errors have occurred are correctly corrected by means of the Golay code. Segments in which more than 3 errors have occurred undergo the same treatment and are incorrectly corrected by the Golay code. It is assumed that 4 errors have occurred in the first two segments A1 ' and A2'. Application of the Golay code to A' then produces the following:

$$A''=(F1,F2,A3,\ldots,A16)$$

In 304, the extended (16, 11, 4) Hamming code is used to correct the two errored segments: F1 is corrected to A1 and F2 is corrected to A2:

$$A''->(A1,A2,A3,\ldots,A16)=A.$$

The PUF reconstruction is thus ended.

The extended Hamming code (16, 11, 4) has the minimum distance 4. A 2-bit error that has occurred in one of its 16-bit long codewords can thus be recognized, but not corrected, by means of this code. However, the two errored segments can nevertheless be corrected by combining the extended Hamming code with the Golay code. This is explained more precisely below with reference to FIG. 4.

Figure 4:
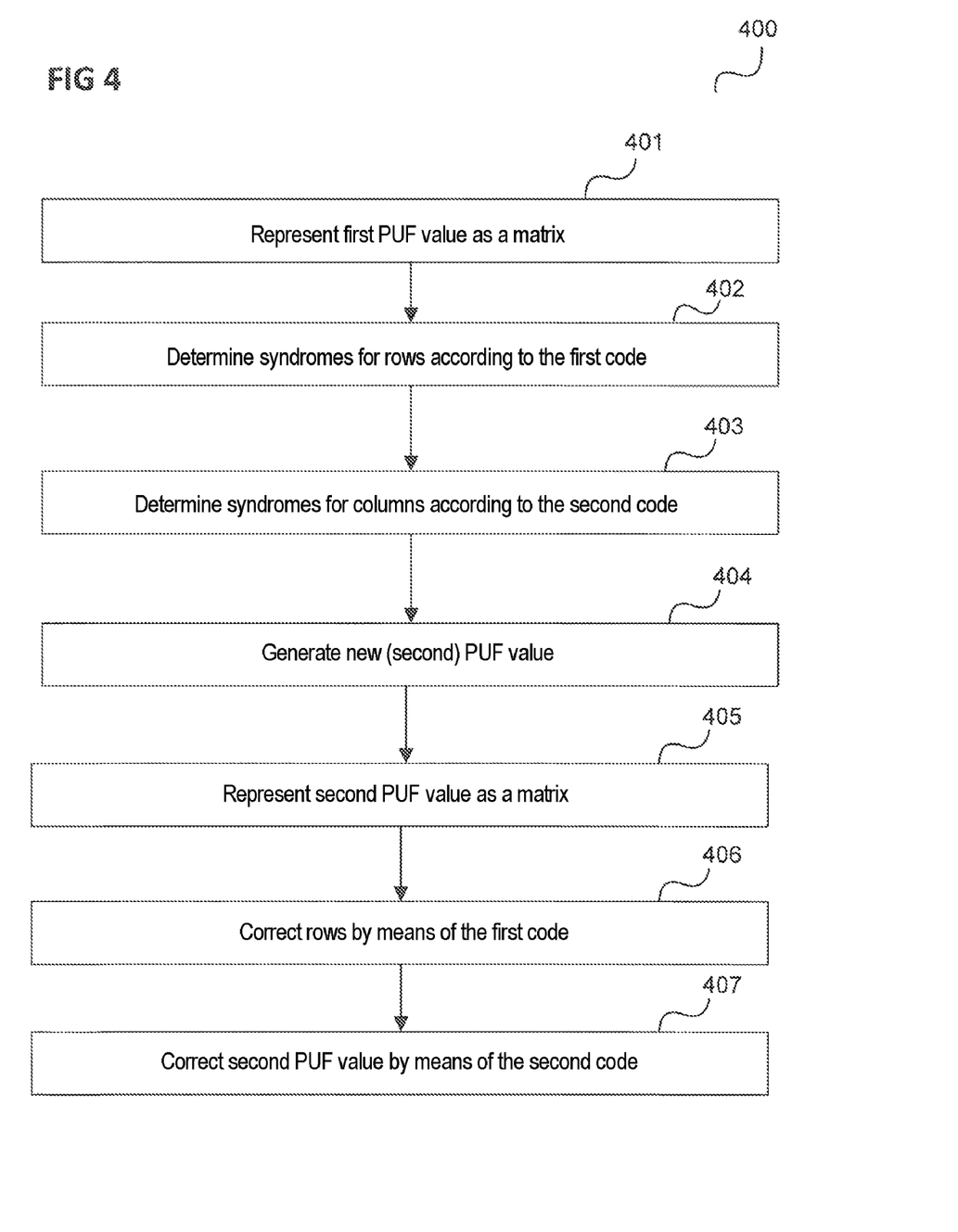
FIG. 4 shows a flow chart which illustrates an example of the reconstruction method for a PUF value according to one embodiment.

FIG. 4 shows a flowchart 400.

Let A=(a1, a2, . . . , a368) the true PUF value, which consists of 368 PUF bits a1, a2, . . . , a368.

In 401, the 368 PUF bits are arranged in a 16×23 matrix:

$$A = \begin{pmatrix} a1 & a2 & a3 & \ldots & a23 \\ a24 & a25 & a26 & \ldots & a46 \\ \ldots & \ldots & \ldots & \ldots & \ldots \\ a346 & a347 & a348 & \ldots & a368 \end{pmatrix}$$

This can be regarded as a division of the PUF value A into segments according to 301.

The rows of this matrix are denoted A1, A2, . . . , A16 and the columns of the matrix by a1, a2, . . . , a23. For example, $$A2=(a24,a25,a26,\ldots,a46)$$

and $$a3 = \begin{pmatrix} a3 \\ a26 \\ a49 \\ \vdots \\ a348 \end{pmatrix}.$$

The rows of the matrix A are therefore row vectors of length 23. The columns of the matrix A are column vectors of length 16.

In 402, for each of the 16 row vectors A1, A2, . . . , A16, according to the (23, 12, 7) Golay code, the syndrome $$Sj=S(Aj)=H1Aj^T \text{ for } j=1,2,\ldots,16,$$

is calculated, where H1 is an 11×23 control matrix of the Golay code. In this way, 16 column vectors S1, S2, . . . , S16 of length 11 are obtained. These 16 column vectors receive 16×11=176 bits in total, and represent the first part of the auxiliary data, also referred to below as the first auxiliary data.

The first auxiliary data can be regarded as an example of the code information stored in 101.

The first auxiliary data are used below to correct the errors typically occurring in a new PUF generation. (It is therefore desirable, for example, always to reconstruct the true, original PUF value A. For example, a cryptographic key is derived from it. With each new PUF generation, a current PUF value is generated which is similar to the true PUF value, but typically differs from it in some bit positions. In this case, this is referred to as "errors that have occurred".)

In 403, the second part of the auxiliary data, referred to below as second auxiliary data, is calculated as follows: For each of the 23 column vectors a1, a2, . . . , a23, according to the (16, 11, 4) extended Hamming code, the syndrome $$sj=S(aj)=H2aj \text{ for } j=1,2,\ldots,23$$

is calculated, where H2 is a 5×16 control matrix defining the extended Hamming code. In this way, 23 column vectors s1, s2, . . . , s23 of length 5 are obtained, which, taken together, contain 23×5=115 bits and represent the second part of the auxiliary data.

The second auxiliary data can be regarded as an example of the code information stored in 102.

The auxiliary data have a total length of 176+115=291 bits. They are stored, for example, in the non-volatile memory of a chip card and are regarded as public data. It is therefore assumed that a potential attacker intending to find out the true PUF value has access to the auxiliary data. It is therefore important to know how much information relating to the unknown 368-bit long PUF value can be obtained from the 291 bits of auxiliary data. At first glance, the 291 bits of auxiliary data also appear to reveal 291 bits of the PUF value. However, closer analysis reveals that only 236 bits of information relating to the true PUF value A can be obtained from the 291 bits of auxiliary data. The reason for this is that the first auxiliary data and the second auxiliary data do not represent any information elements entirely independent from one another. The information elements have a 55-bit redundant component. Thus, 368−236=132 bits of secret information remain. A true 128-bit long cryptographic key, for example, can thus be obtained from the PUF value. The number 132 is furthermore obtained in the following manner: The (23, 12, 7) Golay code and the (16, 11, 4) extended Hamming code are used. The Golay code has the dimension $k_1$=12. The extended Hamming code has the dimension $k_2$=11. The product $k_1 \times k_2$=12×11=132.

In 404, a new (second) PUF value A'=(a1', a2', a3', . . . , a368') is now generated.

In 405, the 368 bits of the new PUF value are similarly arranged to form a 16×23 matrix A':

$$A' = \begin{pmatrix} a1' & a2' & a3' & \ldots & a23' \\ a24' & a25' & a26' & \ldots & a46' \\ \ldots & \ldots & \ldots & \ldots & \ldots \\ a346' & a347' & a348' & \ldots & a368' \end{pmatrix}$$

This can be regarded as a division of the second PUF value A' into segments according to 302.

The 16 rows of this matrix are denoted A1', A2', ..., A16'.

In 406, the segments of the second PUF value A' are corrected using the Golay code as follows. This can be regarded as an example of 103 and 303.

For this purpose, for each of the 23-bit long row vectors A1', A2', ..., A16', according to the (23, 12, 7) Golay code, the syndrome $$Sj' = S(Aj') = H1 Aj'^T \text{ for } j=1,2,\ldots,16$$

is calculated.

It should be noted that neither the rows A1, A2, ..., A16 of the matrix A representing the true PUF value, nor the rows A1', A2', ..., A16' of the matrix A' representing the current PUF value are codewords in the (23, 12, 7) Golay code. Only the syndromes for these 23-bit long row vectors were calculated in the Golay code.

For a row vector Aj of the matrix A and the corresponding row vector Aj' of the matrix A', if no errors have occurred in the jth segment during the new PUF generation, Aj'=Aj applies.

However, if errors have occurred in the jth segment during the PUF generation, this can be described by a corresponding 23-bit long error vector Ej. The following then applies:

$$Aj' = Aj + Ej.$$

If an error has occurred, e.g. at positions 3, 5, and 23 in the jth segment, the error vector has the form $$Ej = (00101000000000000000001).$$

The rows of the matrix A' are corrected as follows: The following applies to the row vectors Aj' and Aj:

$$Aj' = Aj + Ej.$$

Consequently (due to the linearity of the syndrome mapping):

$$S(Ej) = S(Aj' + Aj) = S(Aj') + S(Aj) = Sj' + Sj.$$

The 11-bit long column vectors Sj and Sj' are known: Sj is a constituent part of the first auxiliary data and Sj'=S(Aj') is the syndrome of the current PUF segment Aj'. The syndrome S(Ej) of the unknown error vector Ej can therefore be calculated.

The decoder for the (23, 12, 7) Golay code receives as input the 11-bit long column vector S(Ej) and supplies as output the 23-bit long column vector vj. The output vector vj matches the required error vector Ej precisely when fewer than 4 bit errors have occurred in the jth segment. Let $$Aj'' := Aj' + vj.$$

If fewer than 4 errors have occurred in the jth segment, vj=Ej applies. Then:

$$Aj'' = Aj' + vj = Aj' + Ej = Aj$$

is the jth segment of the true PUF value A. The reconstruction of the jth segment of the true PUF value has therefore succeeded.

However, if 4 or more errors have occurred in the jth segment, vj is not equal to Ej. In this case, $$Aj'' := Aj' + vj$$

does not match Aj. The reconstruction of the jth segment of the true PUF value has failed.

The 23-bit long output vectors v1, v2, ..., v16 received from the Golay decoder are added successively to the row vectors A1', A2', ..., A16' (e.g. implemented by means of a bitwise XOR). The matrix $$A'' = \begin{pmatrix} a1'' & a2'' & a3'' & \ldots & a23'' \\ a24'' & a25'' & a26'' & \ldots & a46'' \\ \ldots & \ldots & \ldots & \ldots & \ldots \\ a346'' & a347'' & a348'' & \ldots & a368'' \end{pmatrix}$$

is formed from the obtained row vectors Aj''. The rows of the matrix A'' are denoted A1'', A2'', ..., A16''. The columns of the matrix A'' are denoted a1'', a2'', ..., a23''.

As explained above, the rows of the matrix A'' may differ from the rows of A. In 407, the segments (i.e. the rows) of A'' are corrected as follows using the extended Hamming code. This can be regarded as an example of 304 and has the processing steps described below, which can be regarded as examples of 104 to 109.

For each of the 16-bit long column vectors aj'', according to the (16, 11, 4) extended Hamming code, the syndrome $$sj'' = S(aj'') = H2 aj'' \text{ for } j=1,2,\ldots,23.$$

is calculated.

The following applies:

$$aj'' = aj + ej,$$

where the error vector ej is a column vector of length 16. (If no errors are present, i.e. if aj''=aj applies, ej is the zero vector.)

The column vectors s1, s2, ..., s23, which form the second auxiliary data, are then used. From $$ej = aj'' + aj,$$

it follows that $$S(ej) = S(aj'' + aj) = S(aj'') + S(aj) = sj'' + sj := bj \quad \text{for} \quad j=1, 2,\ldots,23,$$

where the syndrome calculations take place in the (16, 11, 4) extended Hamming code. Since sj and sj'' are available, bj=S(ej), the syndrome of the error vector ej, can be calculated.

Each control matrix of the (16, 11, 4) extended Hamming code contains as column vectors all 16 column vectors of length 5 of odd Hamming weight, i.e. each column vector of the control matrix contains 1, 3, or 5 ones. The sequence of these column vectors is random; there are therefore a plurality of control matrices for the (16, 11, 4) extended Hamming code.

The following control matrix H is used below as a basis for the (16, 11, 4) extended Hamming code:

$$H = \begin{pmatrix} 1 & 0 & 0 & 0 & 0 & 1 & 0 & 0 & 1 & 1 & 1 & 0 & 1 & 0 & 1 & 1 \\ 0 & 1 & 0 & 0 & 0 & 1 & 1 & 0 & 0 & 1 & 1 & 1 & 0 & 1 & 0 & 1 \\ 0 & 0 & 1 & 0 & 0 & 1 & 1 & 1 & 0 & 0 & 0 & 1 & 1 & 0 & 1 & 1 \\ 0 & 0 & 0 & 1 & 0 & 0 & 1 & 1 & 1 & 0 & 1 & 0 & 1 & 1 & 0 & 1 \\ 0 & 0 & 0 & 0 & 1 & 0 & 0 & 1 & 1 & 1 & 0 & 1 & 0 & 1 & 1 & 1 \end{pmatrix}$$

The columns of this control matrix H are denoted h1, h2, ..., h16.

The 23 columns of the matrix A'' are examined by means of the extended Hamming code (using the second auxiliary data). To do this, the 23 five-bit long column vectors b1, b2, ..., b23 are calculated by $$bj=S(aj'')+sj \text{ for } j=1,2,\ldots,23$$

This can be regarded as a comparison of the syndromes of the columns of the matrix A" with the prestored syndromes (i.e. of the second auxiliary data) and therefore as an example of 104.

Four cases are distinguished below:

In the first case, the matrix A" is already error-free, i.e. A"=A.

In the second case, one row of the matrix A" is errored.

In the third case, there are two errored rows in A".

In the fourth case, more than two rows of the matrix A" are errored, or only 2 rows are errored, but all errors occurred at the same positions.

The first three cases can be corrected using the column vectors b1, b2, ..., b23. In the fourth case, the PUF reconstruction fails.

The four cases are explained below with reference to FIG. 5A to FIG. 5E.

FIG. 5A to FIG. 5E show error distributions in the matrix representation corrected according to the Golay code.

In FIG. 5A to FIG. 5E, each component of the matrix A" is represented in each case by a square, wherein an empty square represents matching with the matrix A in this component and a filled square represents a lack of matching with the matrix A in this component (i.e. an error).

Figure 5A:
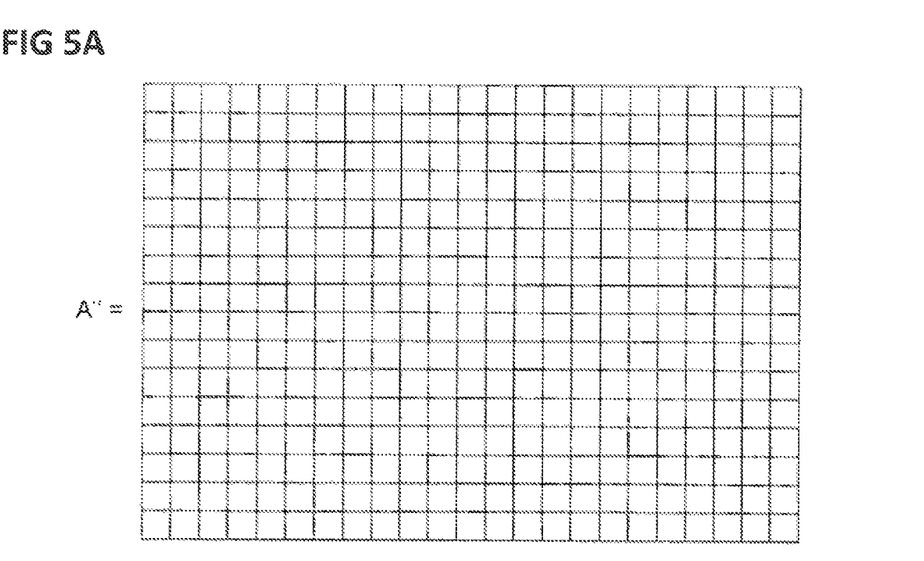
FIGS. 5A to 5E show examples of error distributions in the PUF value reconstruction.

Case 1: All 16 rows of A" are already error-free. This is shown in FIG. 5A.

This means that the following applies:

$$bj = \begin{pmatrix} 0 \\ 0 \\ 0 \\ 0 \\ 0 \end{pmatrix} \text{ for } j = 1, 2, \ldots, 23.$$

In this case, A"=A is set.

Case 2: One row of A" is errored.

Figure 5B:
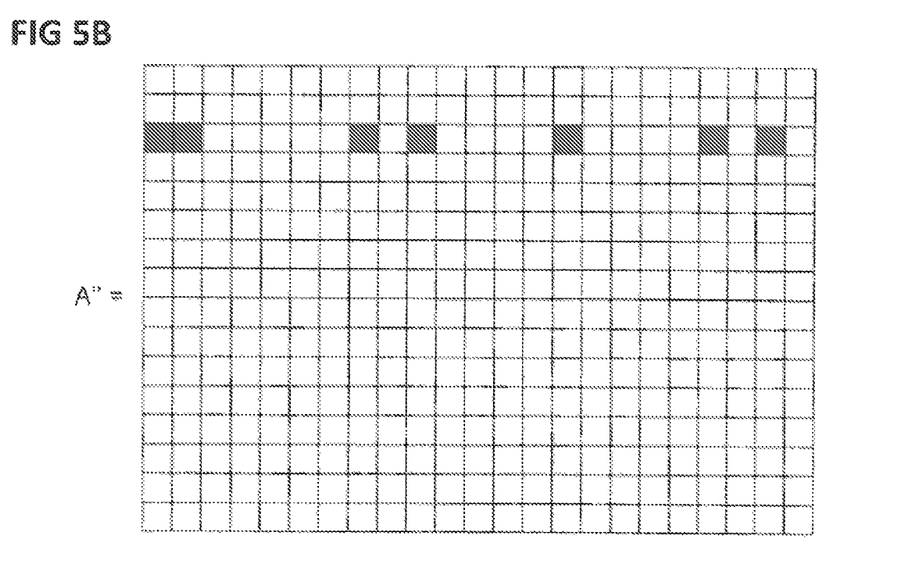

As an example, the third row of A" is assumed to be errored. The third row is therefore assumed to contain 7 errors, which are located, for example, at positions 1, 2, 8, 10, 15, 20, and 22, as shown in FIG. 5B.

The 23 column vectors b1, b2, ..., b23 have the form:

$$b1 = b2 = b8 = b10 = b15 = b20 = b22 = \begin{pmatrix} 0 \\ 0 \\ 1 \\ 0 \\ 0 \end{pmatrix} = h3$$

All other column vectors $b_k$ are identical to the zero vector. From $(0,0,1,0,0)^T=h3$, it can be concluded that the third row of A" is the errored row.

It should be noted here that h3 is the third column vector of the above control matrix H for the extended Hamming code and, if the syndrome is identical to the jth column of the control matrix, a 1-bit error is present at the jth position.

The numbers j of the column vectors bj which are identical to h3 provide the error positions j=1, 2, 8, 10, 15, 20, 22. These seven errored entries of the matrix A" are corrected. The resulting matrix A represents the true PUF value.

Figure 5C:
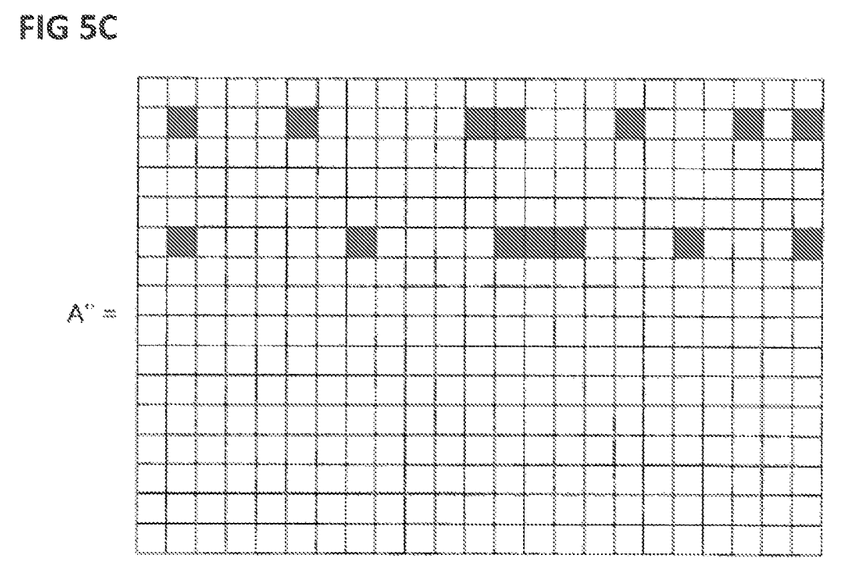

Case 3: Two rows of A" are errored. As an example, it is assumed that the errors are distributed as shown in FIG. 5C.

The following applies:

$$b1 = b3 = b4 = b5 = b7 = b9 = b10 = b11 = b16 = b18 = b20 = b22 = \begin{pmatrix} 0 \\ 0 \\ 0 \\ 0 \\ 0 \end{pmatrix}$$

From the associated indices 1, 3, 4, 5, 7, 9, 10, 11, 16, 18, 20, 22, it can be concluded that the corresponding column vectors a1", a3", a4", a5", a7", a9", a10", a11" a16", a18", a20", and a22" of the matrix A" are errored.

The following furthermore applies:

$$b2 = b13 = b23 = \begin{pmatrix} 1 \\ 0 \\ 1 \\ 0 \\ 0 \end{pmatrix}$$

From the fact that these three vectors are identical to a vector of even Hamming weight, it can be concluded that a two-bit error occurs in the associated columns a2", a13", and a23" of the matrix A".

The two-bit errors are recognized, but cannot be corrected without additional information. Their correction is initially deferred.

The following furthermore applies:

$$b6 = b12 = b17 = b21 = \begin{pmatrix} 0 \\ 1 \\ 0 \\ 0 \\ 0 \end{pmatrix} = h2.$$

The four vectors match h2, the second column vector of the control matrix H. From this, it can be concluded that the second row of A" contains errors, in fact at positions 6, 12, 17, and 21. These errors are corrected.

Finally, the following applies $$b8 = b14 = b15 = b19 = \begin{pmatrix} 1 \\ 1 \\ 1 \\ 0 \\ 0 \end{pmatrix} = h6.$$

From this, it can be concluded that errors occur in the 6th row of A" at positions 8, 14, 15, and 19. These errors are corrected.

The two-bit errors can now also be corrected: It is known that the 2nd and 6th row of the matrix A" were and still are in part errored (since at least 7 errors must occur in an errored row). Furthermore, it is known that a two-bit error occurs in the 2nd, 13th, and 23rd column of the matrix A". It can thus be assumed that the two-bit error occurs in each case at the intersection of the respective column with the 2nd and 6th row. The six entries of the matrix A" are therefore corrected at the intersections of the 2nd and 6th row with the 2nd, 13th and 23rd column.

Once the two-bit errors have also been corrected, the matrix A representing the true PUF value occurs.

A test can be carried out by checking whether the column vector $$b2 = b13 = b23 = \begin{pmatrix} 1 \\ 0 \\ 1 \\ 0 \\ 0 \end{pmatrix}$$

matches the sum $$h2 + h6 = \begin{pmatrix} 0 \\ 1 \\ 0 \\ 0 \\ 0 \end{pmatrix} + \begin{pmatrix} 1 \\ 1 \\ 1 \\ 0 \\ 0 \end{pmatrix} = \begin{pmatrix} 1 \\ 0 \\ 1 \\ 0 \\ 0 \end{pmatrix}$$

This is confirmed to be the case since a two-bit error has actually occurred at positions 2 and 6 in the columns a2", a13', and a23".

Figure 5D:
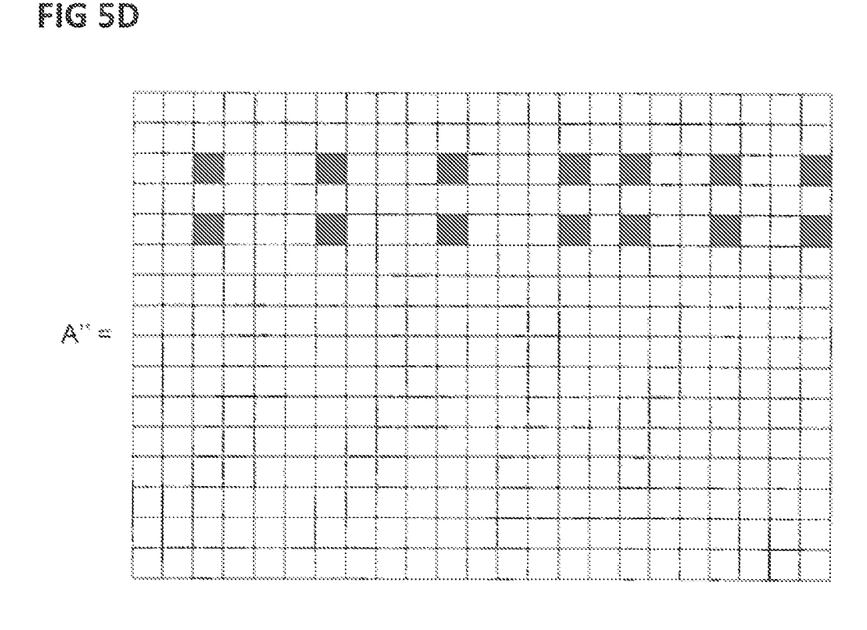
Figure 5E:
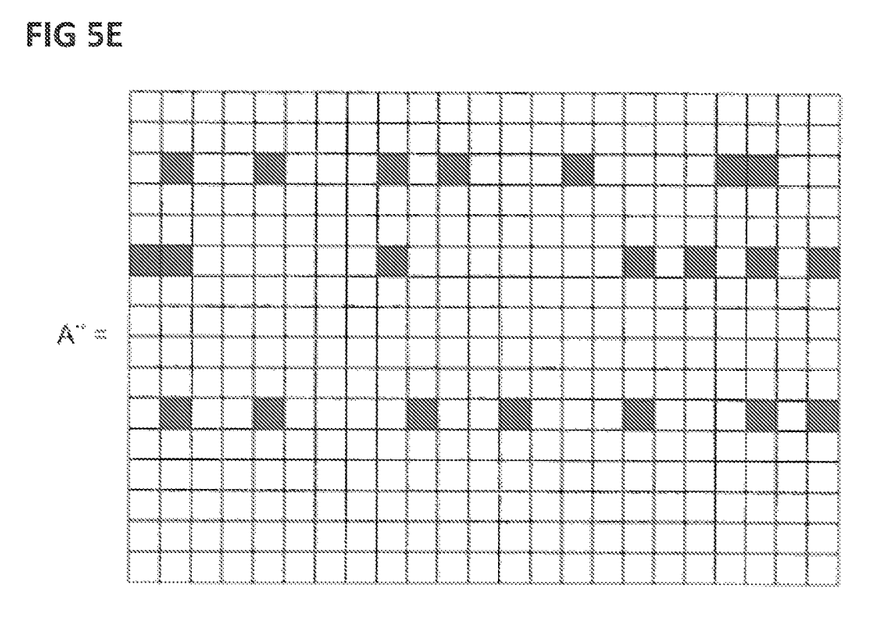

Case 4: 2 rows are errored, but all errors occurred at the same positions (Case 4a) or more than two rows of the matrix A" are errored (Case 4).

Case 4a: FIG. 5D shows an error distribution which cannot be corrected. However, this example represents an improbable exceptional case.

There are $$b3 = b7 = b11 = b15 = b17 = b20 = b23 = \begin{pmatrix} 0 \\ 0 \\ 1 \\ 0 \\ 1 \end{pmatrix}.$$

For all others j, bj=0 applies.

In this case, seven vectors bj of even Hamming weight occur, thus providing an indication of a two-bit error in the corresponding columns. The zero vector always occurs for the other columns. Furthermore, the non-zero vectors bj are all identical. Taken together, this is a strong indication that two rows of the matrix A" are errored. However, the positions of the two errored rows cannot be determined in the present case.

The following applies:

$$\begin{pmatrix} 0 \\ 0 \\ 1 \\ 0 \\ 1 \end{pmatrix} = h1 + h15 = h2 + h12 = h3 + h5 = h4 + h8 = \ldots = h11 + h16.$$

From the available data bj, j=1, 2, . . . , 23 it does not therefore unambiguously follow that—as shown in FIG. 5D—the rows A3" and A5" are the errored rows. The rows A1" and A15" could equally be errored, or the rows A2" and A12", etc.

In the present case, although the two errored rows of the matrix A" cannot be corrected, it is recognized that (at least) two rows of the matrix A" are incorrect. Although the PUF reconstruction has not been successful, an incorrect vector has at least not been reconstructed.

Case 4b: If three (as in FIG. 5E) or more rows of the matrix A" are errored, it is generally not possible to repair the matrix A" (i.e. to reconstruct the matrix A representing the true PUF value from it).

To summarize, in one embodiment, a linear (n, k, d) code (for example the (23, 12, 7) Golay code) is used in combination with a (2m, 2m-m-1, 4) extended Hamming code (for example with the (16, 11, 4) extended Hamming code) in order to correct (i.e. reconstruct) PUF values with low to moderate error rates.

The first correction step is carried out by the linear (n, k, d) code. This code is applied to PUF segments of length n. Most of the segments are error-corrected in this step. Even if two segments remain errored, they can—almost always—be made error-free in the second correction step. The second correction step is carried out by the extended Hamming code.

It should be noted that, since the extended Hamming code has the minimum distance d=4, it is not strong enough to correct a two-bit error in a single codeword. (A code with d=5 is required for this purpose, but this involves greater complexity.) However, as described above, two segments can be corrected with the extended Hamming code. The extended Hamming code can be economically implemented in hardware.

In the above embodiment, the PUF value has a length of 368 bits and a 132-bit (or e.g. a 128-bit) long key can be formed from it. Smaller key lengths are also useful for RFID applications. In the following embodiment, the PUF value therefore has a length of 256 bits, and a 72-bit long key can be obtained from it.

The (23, 12, 7) Golay code, which has the length 23, can be used in this embodiment also. From the 256 PUF bits, three bits are discarded to obtain a PUF length divisible by 23: 253=11×23. The 253-bit long PUF value is represented in the form of an 11×23 matrix A. The matrix A has 11 rows and 23 columns. For each of the 11 rows of the matrix A, the syndrome is calculated according to the (23, 12, 7) Golay code. The 11 syndromes represent the first part of the auxiliary data.

The second part of the auxiliary data is generated through syndrome calculations of the columns of the matrix A according to an extended Hamming code.

It should be noted here that the columns of the matrix A have the length 11. They are therefore too short for a direct application of the (16, 11, 4) extended Hamming code (which has the length 16). On the other hand, the columns are too long for the next smallest, the (8, 4, 4) extended Hamming code (which has the length 8). The (16, 11, 4) extended Hamming code length 11 is therefore shortened in this embodiment.

To do this, the control matrix H is shortened for the (16, 11, 4) extended Hamming code (see above) by deleting five (random) columns. The existing 5×11 matrix H' then defines a linear (11, 6, 4) code which has the required length 11. For example, the columns 10 to 15 can be deleted. This provides the matrix $$H = \begin{pmatrix} 1 & 0 & 0 & 0 & 0 & 1 & 0 & 0 & 1 & 1 & 1 \\ 0 & 1 & 0 & 0 & 0 & 1 & 1 & 0 & 0 & 1 & 1 \\ 0 & 0 & 1 & 0 & 0 & 1 & 1 & 1 & 0 & 0 & 0 \\ 0 & 0 & 0 & 1 & 0 & 0 & 1 & 1 & 1 & 0 & 1 \\ 0 & 0 & 0 & 0 & 1 & 0 & 0 & 1 & 1 & 1 & 0 \end{pmatrix}$$

This matrix defines the (11, 6, 4) code.

Using the control matrix H', the syndromes $s_j$ of the column vectors $a_j$ of the matrix A are calculated:

$$s_j = S(a_j) = H' a_j \text{ for } j = 1, 2, \ldots, 23.$$

These 23 syndromes are column vectors of length 5. They represent the second part of the auxiliary data.

The further procedure is the same as for the PUF value of length 368 dealt with above.

In the embodiments described above, the (23, 12, 7) Golay code is used to correct the individual PUF segments (which are in each case 23 bits long). The correction may fail in up to two segments. The errored segments are then repaired using the extended Hamming code.

The specific Golay code can be replaced by any given linear (n, k, d) code. The linear code operates on PUF segments of length n. Most of the segments are corrected by the linear code. The error correction may fail in two or fewer segments. These segments are then repaired by the extended Hamming code. A further generalization is possible using any given code with an even minimum distance instead of an extended Hamming code with a minimum distance of 2.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for reconstructing a first vector from a second vector, the method comprising:
    storing, according to a matrix representation of the first vector, code information for the row vectors according to a first code in a memory;
    storing, according to the matrix representation of the first vector, code information for the column vectors according to a second code in a memory;
    correcting the row vectors of a matrix representation of the second vector corresponding to the matrix representation of the first vector with a first corrector circuit so that the row vectors of the second vector have the same code information according to the first code as the row vectors of the first vector;
    calculating the code information of the column vectors of the matrix representation of the second vector with a calculation device according to the second code;
    comparing the code information of the column vectors of the second vector with the code information of the column vectors of the first vector with a comparator circuit;
    identifying, on the basis of the result of the comparison, the columns of the matrix representation in which the first vector is not equal to the second vector using an identifier circuit;
    identifying, using the errors in the columns correctable by means of the second code, the rows of the matrix representation in which the first vector is not equal to the second vector using the identifier circuit;
    identifying, using the identified columns and the identified rows, the components in which the first vector is not equal to the second vector using the identifier circuit; and
    correcting the identified components of the second vector using a second corrector circuit.

2. The method of claim 1,
    wherein the code information for a column vector is a syndrome of the column vector and the code information for a row vector is a syndrome of the row vector.

3. The method of claim 1,
    wherein the components which are located in the identified rows in columns which have errors that cannot be corrected by means of the second code are identified as the components in which the first vector is not equal to the second vector.

4. The method of claim 1,
    wherein the row vectors of the second vector are corrected so that the row vectors of the second vector have the same code information according to the first code as the row vectors of the second vector, in such a way that the number of modified components of the second vector is minimal.

5. The method of claim 1,
    wherein the first vector represents a PUF value and the second vector represents a Physical Uncloneable Functions value.

6. The method of claim 5,
    wherein the first vector represents a true Physical Uncloneable Functions value and wherein the second vector represents a newly generated Physical Uncloneable Functions value.

7. The method of claim 1,
    wherein the first vector and the second vector are binary vectors.

8. The method of claim 1,
    wherein the first code is a linear code.

9. The method of claim 8,
    wherein the first code is the (23, 12, 7) Golay code.

10. The method of claim 1,
    wherein the second code is a linear code.

11. The method of claim 1,
    wherein the second code has an even minimum distance.

12. The method of claim 11,
    wherein the second code has the minimum distance of 4.

13. The method of claim 1,
    wherein the second code is an extended Hamming code.

14. The method of claim 13,
    wherein the second code is the (16, 11, 4) extended Hamming code.

15. The method of claim 1,
    wherein the matrix representation of the first vector is a representation of the first vector as a matrix in which consecutive segments of the vector form the rows of the matrix.

16. The method of claim 1, further comprising:
    performing of a cryptographic operation based on the corrected second vector.

17. The method of claim 1, further comprising:
    deriving a cryptographic key from the corrected second vector.

18. A data processing device for reconstructing a vector from an input vector, the data processing device comprising:
    a memory configured to store, according to a matrix representation of the vector, code information for the row vectors according to a first code and to store, according to the matrix representation of the vector, code information for the column vectors according to a second code;

a first corrector configured to correct the row vectors of a matrix representation of the second vector corresponding to the matrix representation of the first vector so that the row vectors of the second vector have the same code information according to the first code as the row vectors of the first vector;

a calculation device configured to calculate the code information of the column vectors of the matrix representation of the second vector according to the second code;

a comparator configured to compare the code information of the column vectors of the second vector with the code information of the column vectors of the first vector;

an identifier configured to
   identify, on the basis of the result of the comparison, the columns of the matrix representation in which the first vector is not equal to the second vector;
   identify, using the errors in the columns correctable by means of the second code, the rows of the matrix representation in which the first vector is not equal to the second vector; and
   identify, using the identified columns and the identified rows, of the components in which the first vector is not equal to the second vector; and a second corrector configured to correct the identified components of the second vector.

* * * * *